(12) United States Patent
Deco et al.

(10) Patent No.: US 6,226,549 B1
(45) Date of Patent: May 1, 2001

(54) METHOD FOR CLASSIFYING A TIME SERIES, THAT INCLUDES A PRESCRIBABLE PLURALITY OF SAMPLES, WITH A COMPUTER

(75) Inventors: Gustavo Deco; Christian Schittenkopf, both of München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/202,649

(22) PCT Filed: May 15, 1997

(86) PCT No.: PCT/DE97/00985

§ 371 Date: Jul. 12, 1999

§ 102(e) Date: Jul. 12, 1999

(87) PCT Pub. No.: WO97/50047

PCT Pub. Date: Dec. 31, 1997

(30) Foreign Application Priority Data

Jun. 21, 1996 (DE) ............................................. 196 24 849

(51) Int. Cl.$^7$ ....................................................... A61B 5/04
(52) U.S. Cl. ........................................... 600/518; 600/544
(58) Field of Search ................................... 600/515, 516, 600/544

(56) References Cited

U.S. PATENT DOCUMENTS

| | | | |
|---|---|---|---|
| 5,092,341 | * 3/1992 | Kelen | 600/515 |
| 5,191,524 | * 3/1993 | Pincus et al. | 364/413.05 |
| 5,211,179 | * 5/1993 | Haberl et al. | |
| 5,645,069 | * 7/1997 | Lee | 128/702 |
| 5,709,214 | * 1/1998 | Skinner | 128/702 |
| 5,857,979 | * 1/1999 | Ryn et al. | 600/544 |
| 5,995,868 | * 11/1999 | Dorfmeister et al. | 600/544 |

OTHER PUBLICATIONS

Prichard et al, "Generalized Redundancies for Series Analysis", *Physica D*, Jul. 1, 1995, Netherlands, Elseveir, BD. 84, ISSN 0167–2789, pp. 476–494.*

Pawelzik K et al: "Generalized Dimensions and Entropies from a Measured Time Series", *Physical Review a (General Physics)*, Jan. 1, 1987, USA, BD. 35, NR. 1, ISSN 0556–2791, pp. 481–484, XP002042713.

Pilgrim B et al: "Application of Nonlinear Methods to Respiratory Data of Infants During Sleep", *Proceedings of the Annual International Conference of the Engineeri in Medicine and Biology Society*, Paris, Oct. 29–Nov. 1, 1992, BD. 14, Morucci J.P; Plosney R; Coatrieux J L; Swamy Laxminarayan pp. 1620–1621, XP000347056.

Provenzale A et al: "Distinguishing Between Low–Dimensional Dynamics and Randomness in Measured Time Series", IVTAM Symposium and NATO Advanced Research Workshop on the Interpretation of Time Series From Nonlinear Mechanical Systems, Coventry, UK, Aug. 26–30, 1991, BD. 58, NA 1–4, ISSN 0167–2789, Physica D, Sep. 15, 1992, Netherlands, pp. 31–49, XP002042714.

Prichard et al: "Generalized Redundancies for Time Series Analysis", Physica D, Jul. 1, 1995, Netherlands, BD. 84, NR. 3–4, ISSN 0167–2789, pp. 476–493, XP002042715.

* cited by examiner

*Primary Examiner*—Carl H. Layno
(74) *Attorney, Agent, or Firm*—Bell, Boyd & Lloyd LLC

(57) ABSTRACT

A method for classifying a time series, that includes a prescribable plurality of samples, with a computer wherein generalized correlation integral is determined for at least a part of samples of a time series. A functions family of an entropy function is determined from the values of the generalized correlation integral. A plurality of considered future samples is thereby employed as a family parameter of the functions family. The time series is classified into various types of characteristic processes from the curve of the functions family of the entropy function.

13 Claims, 4 Drawing Sheets

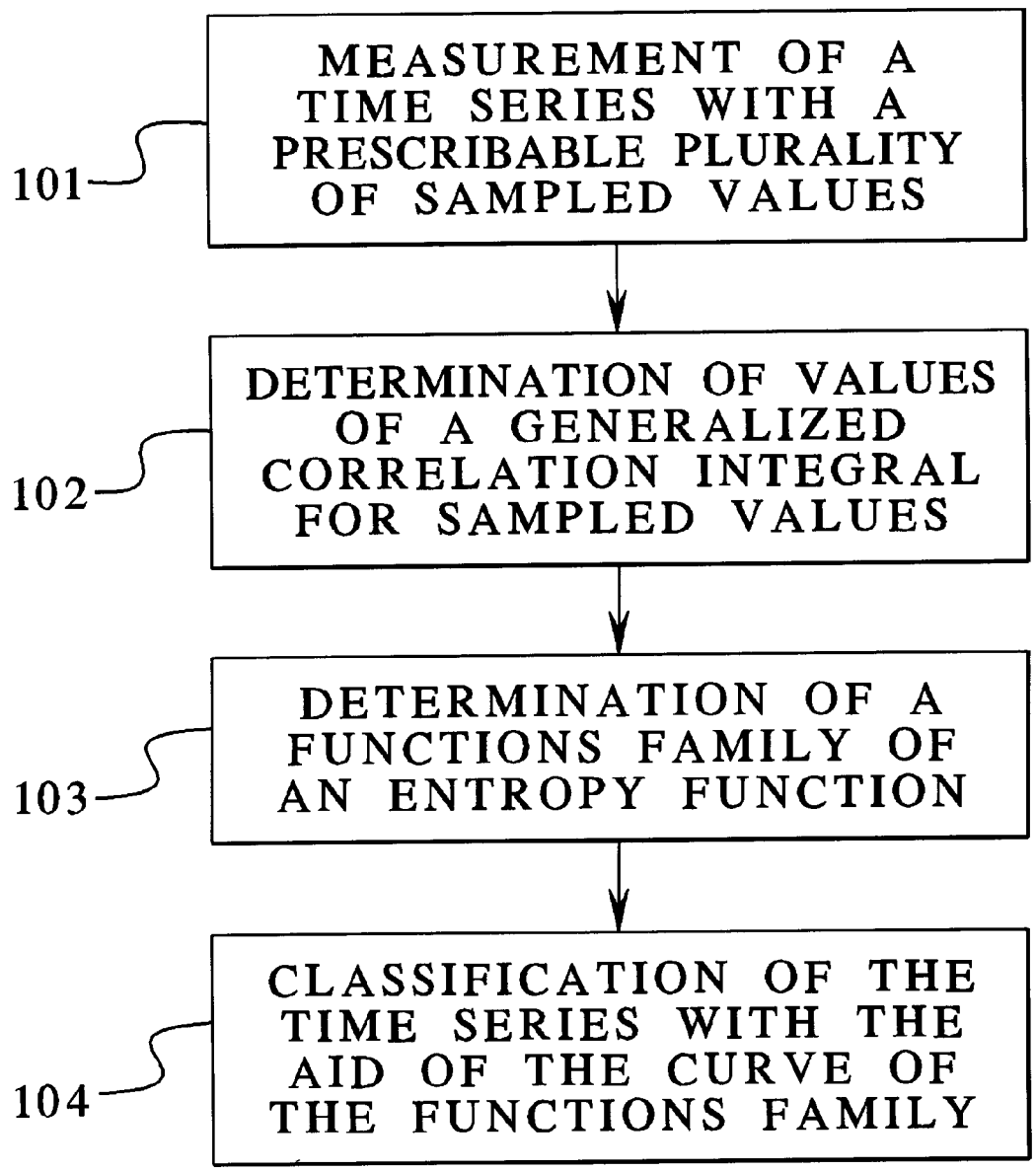

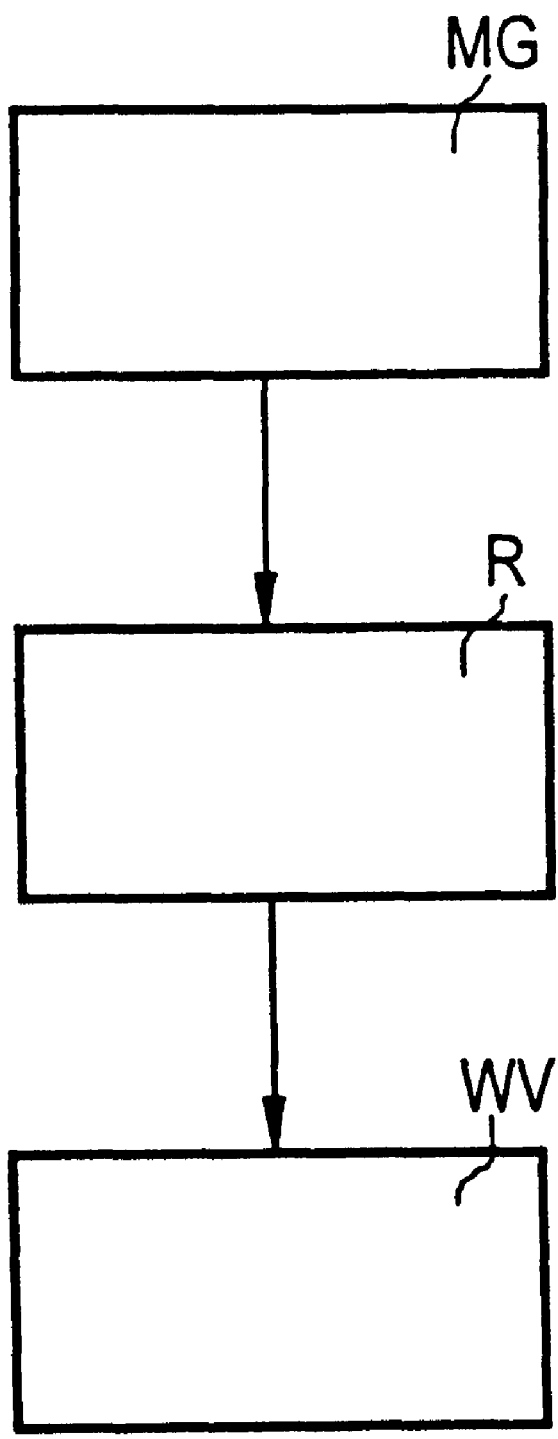

METHOD FOR CLASSIFYING A TIME SERIES, THAT INCLUDES A PRESCRIBABLE PLURALITY OF SAMPLES, WITH A COMPUTER

BACKGROUND OF THE INVENTION

1. Field of the Invention

The present invention relates to a method wherein it is possible to distinguish between a process characterized by a time series that describes a white noise and a Markov process, and wherein it is also possible to distinguish between a chaotic process and a chaotic process with underlying noise.

2. Description of the Prior Art

Technical fields in which it is of interest to draw conclusions about the future behavior of a time series from a measured time series can be seen, for example, in various areas of medicine. The prediction of a future course of a time series usually occurs given the assumption that the time series exhibits non-linear correlations between the samples of the time series. For example, a specific area of application within medicine is cardiology. Specifically in the problem area of sudden cardiac death, it is critical to recognize the early warning signs of sudden cardiac death in order to initiate counter-measures against the occurrence of sudden cardiac death as early as possible.

It generally represents a considerable problem to classify a measured signal, particularly an electrical signal, and its samples, for example, in a purely chaotic process, a chaotic process with underlying noise, a process with white noise or a Markov process.

For example, document [1] discloses the determination of what is referred to as a Kolmogorov entropy. Further, this document discloses that a correlation function, that is explained in greater detail later, be formed.

It is known from documents [2], [3] to classify the time series into different types of time series on the basis of correlation integrals of the samples of the time series.

In these methods, however, the problem occurs that certain types of processes and, thus, types of time series cannot be discriminated. For example, it is not possible to distinguish with these methods between a process that is characterized by a time series that describes a white noise and a Markov process.

With this method, further, it also is not possible to distinguish between a chaotic process and a chaotic process with underlying noise.

SUMMARY OF THE INVENTION

The present invention is thus directed to a method for classifying a time series with which the above-described types of time series that cannot be classified with the known methods also can be correctly distinguished and classified.

According to the method of the present invention, an electrical signal is sampled and a generalized correlation integral is determined for an arbitrary plurality of samples upon employment of preceding samples and future samples. The preceding samples and future samples relate to the sample for which the correlation integral is respectively currently intended. A functions family of an entropy function is determined from the plurality of identified values of the generalized correlation integral for the various samples. Given the functions family, an arbitrary plurality of considered, future samples is employed as a family parameter of the functions family. A partition interval quantity of a data space in which the samples can be located is employed as a run variable of the functions family. The time series is classified on the basis of the characteristic course of the functions family of the entropy function.

This method now makes it possible to also distinguish a process having [ . . . ] a time series with underlying white noise from a process having a time series with the characteristics of a Markov process. A discrimination between time series with which a chaotic process is described from time series with which a chaotic process with noise is described is also possible.

A very simple and fast determination of the values of the generalized correlation integral given the consideration of a respectively medium plurality of samples that are located around the sample in an environment having a prescribable size.

A further simplification of the method occurs when the size of the environment is selected dependent on the partition interval quantity.

Further, it is advantageous in a development of the method to accelerate the classification wherein the time series is only classified into a first time series type and into a second time series type. This development of the method makes it possible to merely investigate whether, for example, the time series describes a chaotic process or a chaotic process with noise. This development leads to a considerable saving of calculating time since other specific instances of time series need not be taken into further consideration in the investigation of the time series.

The method can be employed advantageously in various technical fields; for example, when the time series is a measured cardiogram signal, a measured electroencephalogram signal or, a measured signal with which a voltage curve of brain pressure is described [sic]. A very simple and dependable classification of the individual time series and their conclusions for characteristic properties of the signals is possible for these cases.

In an further embodiment of the method, it is provided that stochastic correlations in rate curves of a financial market be determined when the time series is established by such a rate curve. In this way, it is possible to make statements about possible future rate curves of a financial market.

Additional features and advantages of the present invention are described in, and will be apparent from, the Detailed Description of the Preferred Embodiments and the Drawings.

DESCRIPTION OF THE DRAWINGS

FIG. 1 shows the individual method of the present invention steps of the method in a flowchart.

FIG. 4 is a sketch that shows a computer with which the method of the present invention is implemented.

DETAILED DESCRIPTION OF THE PREFERRED EMBODIMENTS

Figure 2A:
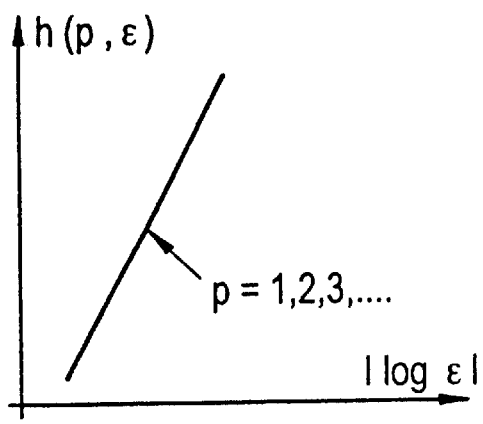
FIGS. 2a–2d show various curves of a functions family of an entropy function that allow conclusions to be drawn about the characteristics of the time series.

FIG. 1 shows the individual method steps of the method of the present invention.

The time series is measured in a first step 101. The time series can be of an analog nature, which requires a sampling of the time series so that the time series can be processed in a computer R. When, however, the time series is already present in individual digital values, then an analog-to-digital conversion of the time series is no longer required. What type of signals the time series can represent, for example, is explained later. The time series exists digitally for the processing in the computer R; i.e., it includes a prescribable plurality of samples x, dependent on a sampling interval with which the time series is sampled.

In a second step 102, a generalized correlation integral is evaluated for at least some of the samples $x_t$ of the time series, and a value $c_t^{n,\tau,p,\hat{N},\varepsilon}$ of the generalized correlation integral is respectively determined for a sample. A correlation integral on which the generalized correlation integral is based is known, for example, from document [1]. A sample vector $\underline{x}_t^{n,\tau,p}$ derives from an arbitrary plurality of samples $x_t$ of the time series at a respective time t. The samples are preferably distanced from one another by a time interval T; i.e., a time interval T respectively lies between two samples $x_t$ and $x_{t+T}$.

Given the correlation integral known from document [1], it is merely provided to take the sample vector $\underline{x}_t^{n,\tau}$ and a partition interval quantity $\varepsilon$ into consideration. What is to be understood by the partition interval quantity $\varepsilon$ is the size of the subdivision of a data space in which the samples $x_t$ of the time series can be located. A critical difference of the generalized correlation integral used in the method of the present invention compared to the known correlation integral may be seen wherein, given the known correlation integral, a respective maximum of one future sample with respect to the respectively currently processed sample $x_t$, i.e. maximally the future sample $x_{t+1}$, is taken into consideration in the determination of the value of the correlation integral.

Given the generalized correlation integral on which the inventive method is based, future samples $x_{t+p\tau}$ with an arbitrary p are taken into consideration in the determination of the values $c_t^{n,\tau,p,\hat{N},\varepsilon}$ of the generalized correlation integral, wherein p references an indication of steps to the respectively considered future sample. For example, a value $c_t^{n,\tau,p,\hat{N},\varepsilon}$ is derived from the generalized correlation integral according to the following rule:

$$c_t^{n,\tau,p,\hat{N},\varepsilon} = \frac{1}{\hat{N}} \sum_{i=1}^{\hat{N}} \Theta\left(\frac{\varepsilon}{f} - \left\|\underline{x}_t^{n,\tau,p} - \underline{x}_i^{n,\tau,p}\right\|\right), \quad (1)$$

with $$\underline{x}_t^{n,\tau,p} = (x_t, x_{t+\tau}, \cdots, x_{t+(n-1)\tau}, x_{t+(n-1+p)\tau}),$$

with $$\Theta(z) = \begin{cases} 0: & z \leq 0 \\ 1: & z > 0 \end{cases}, \text{ whereby}$$

$x_t$ references the sample $x_t$ of the time series at the time t,
$\tau$ references the time interval that respectively lies between two samples $t_t$, $x_{t+1}$,
$x_{t+\tau}$ references a sample of the time series at a time t+$\tau$,
n references a plurality of preceding samples taken into consideration,
p references the plurality of steps (time intervals) to the future sample taken into consideration,
$\underline{x}_t^{n,\tau,p}$ references the sample vector,
f references an arbitrary number,
t references a running index with which all sample vectors $\underline{x}_t^{n,\tau,p}$ that are taken into consideration in the respectively employed, generalized correlation integral at the times t,
N references a plurality of sample vectors $\underline{x}_t^{n,\tau,p}$ that are taken into -t consideration in the respectively employed, generalized correlation integral,
$\varepsilon$ references the partition interval quantity of a data space in which the samples can be located, $\Sigma(z)$ references a heavy side function.

A second possibility for determining the generalized correlation integral can be seen, for example, in the following rule:

$$c_t^{n,\tau,p,\hat{N},\varepsilon} = \frac{1}{\hat{N}} \sum_{i=1}^{\hat{N}} \Theta\left(\frac{\varepsilon}{f} - \left|x_t^{n,\tau,p} - x_i^{n,\tau,p}\right|^m\right), \quad (2)$$

wherein m references an arbitrary number. Correspondingly, an arbitrary norm is referenced $\|\ \|^m$.

In a further step 103, a functions family of an entropy function h(p, $\varepsilon$) is determined from the values $c_t^{n,\tau,p,\hat{N},\varepsilon}$ of the generalized correlation integral for an arbitrary plurality of samples. In the determination 103, the preceding samples and the future samples with respect to the sample for which the value $c_t^{n,\tau,p,\hat{N},\varepsilon}$ of the generalized correlation integral is respectively determined are taken into consideration.

The functions family of the entropy function h(p, $\varepsilon$) derives, for example, according to the following rule:

$$h(p, \varepsilon) = \frac{1}{\tau} \lim_{n \to \infty} \lim_{\hat{N} \to \infty} \frac{1}{\hat{N}} \sum_{t=1}^{\hat{N}} \log \frac{c_t^{n,\tau,p,\hat{N},\varepsilon}}{c_t^{n-1,\tau,1,\hat{N},\varepsilon}}. \quad (3)$$

In this rule, the plurality p of steps to the future sample is employed as a family parameter of the functions parameter of the entropy function h(p, $\varepsilon$). The partition interval quantity $\varepsilon$ is introduced as a running variable in the functions family of the entropy function h(p, $\varepsilon$).

Graphically, the generalized correlation integrals means that the value $c_t^{n,\tau,p,\hat{N},\varepsilon}$ of the generalized correlation integral respectively derives from a medium plurality of samples $x_t$ that are located in an environment of a predetermined size around the sample $x_t$. The value $c_t^{n,\tau,p,\hat{N},\varepsilon}$ of the generalized correlation integral is respectively determined in the environment. In an embodiment of the method of the present invention, it is advantageous to prescribe the size of the environment dependent on the partition interval quantity $\varepsilon$.

As shown in FIGS. 2a through 2d and explained below, the functions family of the entropy function h(p, $\varepsilon$) includes different curves for different types of time series. The time series can be classified in a last step 104 on the basis of the different curves of the functions family of the entropy function h(p, $\varepsilon$).

FIG. 2a shows a typical curve of the functions family of the entropy function h(p, $\varepsilon$) for a process that supplies a time series that is characterized by a white noise. Qualitatively, the functions family of the entropy function h(p, $\varepsilon$) for this time of time series proceeds essentially as a straight positive slope when the partition interval quantity $\varepsilon$ in logarithmized scale $|\log \varepsilon|$ is employed as running variable. What is characteristic of this curve is that the curve is always the same for every value p.

A time series in the functions family of the entropy function h(p, $\varepsilon$) that describes a Markov process (see FIG. 2) exhibits a similar curve but with straight lines having a positive slope respectively shifted approximately parallel. A family of straight lines with positive slope shifted essentially parallel derive for a respectively different plurality p of future samples $x_t$ taken into consideration in the curve of the functions family of the entropy function h(p, $\varepsilon$) for a Markov process.

Advantages of the inventive method can be seen as a result thereof compared to the known method, wherein the plurality p of steps to the future considered sample $x_t$ is not taken into consideration as family parameter in a functions family of the entropy function h(p, $\varepsilon$). A distinction between a process with white noise and a Markov process is not possible given the known discrimination criterion upon employment of the known correlation integral.

Further, a distinction between a chaotic process and a chaotic process with noise is likewise not possible with the known method upon employment of the known correlation integral.

Figure 2B:
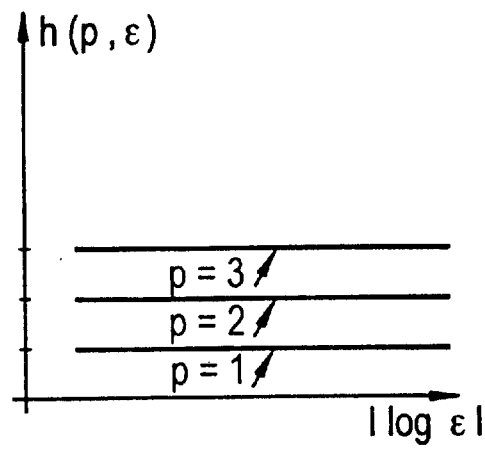
Figure 2C:
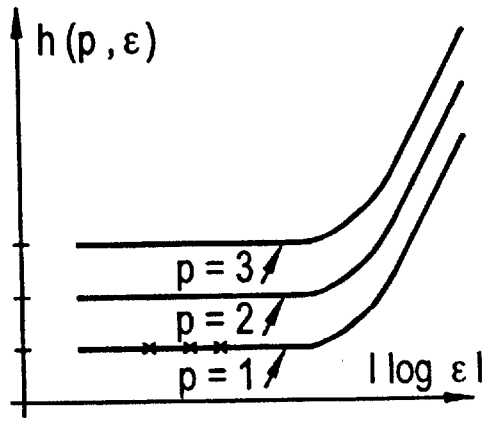
Figure 2D:
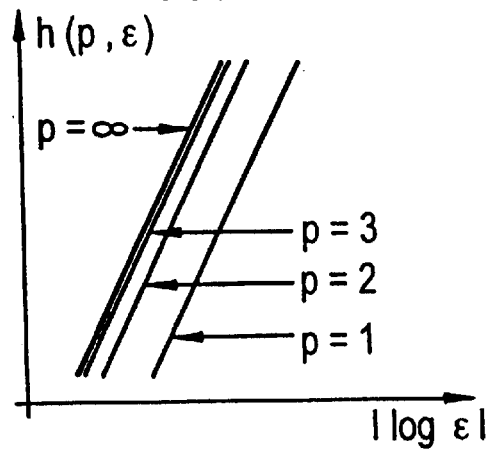

Due to the employment of the plurality p of steps to the future considered sample $x_t$ as family parameter of the functions family of the entropy function $h(p, \epsilon)$, a distinction also becomes possible between these two types of processes, whose characteristic curves are shown in FIGS. 2b and 2c. FIG. 2b describes the curve of the functions family of the entropy function $h(p, \epsilon)$ [. . . ]a time series that describes for a chaotic process. The curve of the functions family of the entropy function $h(p, \epsilon)$ is essentially characterized by substantially horizontally proceeding straight lines shifted parallel.

In contrast, FIG. 2c shows the curve of the functions family of the entropy function $h(p, \epsilon)$ for a time series that describes a chaotic process with noise. Except for a kink partition interval quantity $\epsilon'$, this likewise shows a family of substantially horizontal straight lines shifted parallel. From the kink partition interval quantity $\epsilon'$, this horizontal family of straight lines changes into a family of straight lines with positive slope shifted substantially parallel. By employing the plurality p of steps to the future considered sample $x_t$ as a family parameter of the functions family of the entropy function $h(p, \epsilon)$, a discrimination between two different processes is again possible, which was not possible given employment of known methods.

The above-described characteristic, qualitative curves of the functions families refers to a logarithmized scale $|\log \epsilon|$ for the partition interval quantity $\epsilon$. When only the partition interval quantity $\epsilon$—not logarithmized—is employed as the running variable for the functions family of the entropy function $h(p, \epsilon)$, then the curve of the individual functions is correspondingly changed corresponding to a delogarithmization of the partition interval quantity $\epsilon$.

When a certain prior knowledge about the property of the investigated processes already exists a, for example, when a distinction is merely to be made between two types of time series, then it is advantageous in a development of the method to implement the classification only into a first time series type or into a second time series type. It is thereby possible that the first time series type describes a first time series in which a stochastic structure exists between the samples of the time series, and the second time series type describes a time series in which there is not stochastic structure between the samples of the time series. Due to this development of the method, the implementation of the method with the computer R is considerably simplified and, thus, accelerated since not all possible characteristics of curves of the functions family of the entropy function $h(p, \epsilon)$ have to be investigated.

Figure 3:
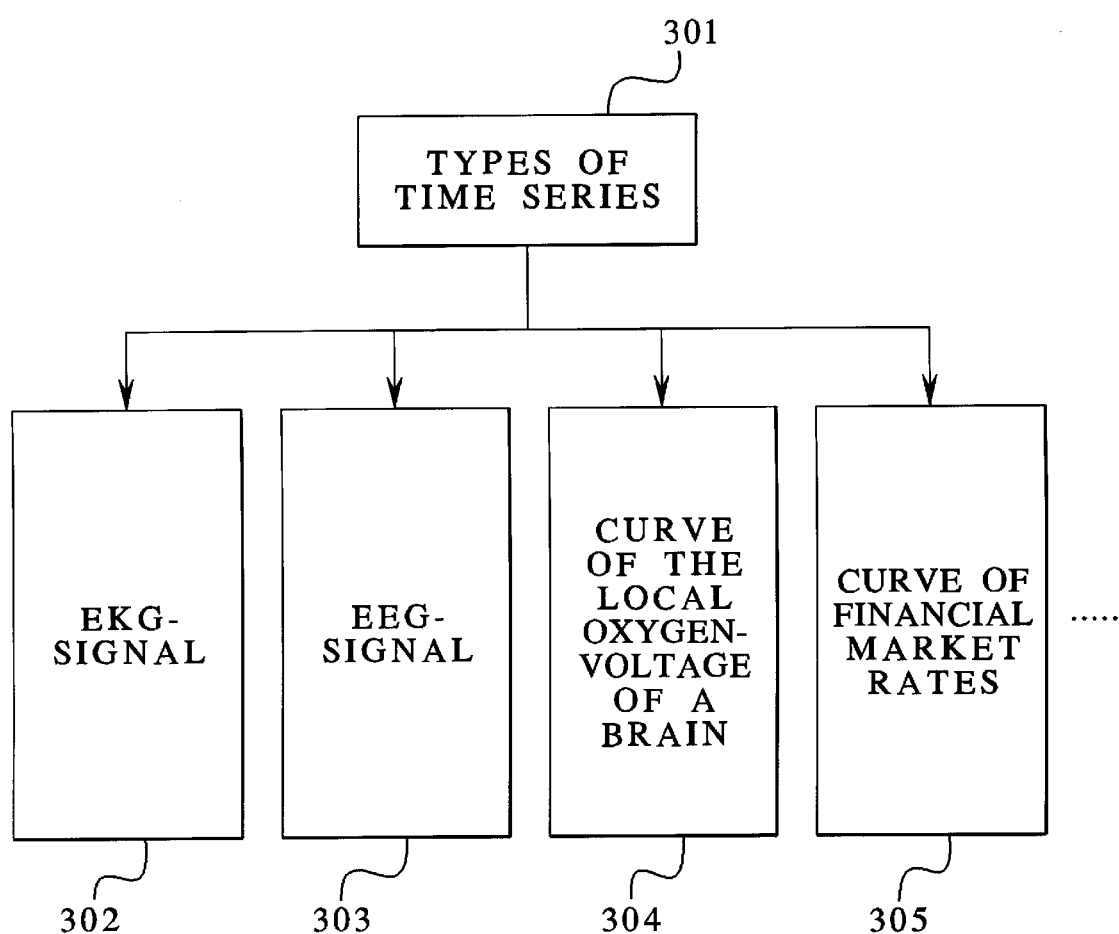
FIG. 3 is a block diagram that shows the various possibilities of what type the time row can be.

FIG. 3 shows 301 various types of signals that can establish the time series. The time series can be realized 302 by an electrocardiogram signal (ECG). An advantageous employment is provided for this application since, as described in document [4], a conclusion can be drawn for a heart given the appearance of non-linear correlations between the samples of the electrocardiogram signal that this heart is at risk with respect to the occurrence of a sudden cardiac death. In the binary classification, the classification of the second time series into the first time series type thereby corresponds to a classification of the electrocardiogram signal into an electrocardiogram signal of a heart at risk with respect to sudden cardiac death. In this case, the second time series type corresponds to an electrocardiogram signal of a heart not at risk with respect to sudden cardiac death.

It is also provided that the time series can be established 303 by an electroencephalogram signal (EEG).

Further, the time series can be established by a signal that describes 304 the curve of a local oxygen voltage of a brain. Further, the time series can be established 305 by a signal that describes variable rates of a financial market; for example, in foreign exchange commerce or general stock quotations, quotations of stock indicators, etc.

FIG. 4 shows a computer 4 with which the inventive method is implemented. The computer R processes the time series registered by the measuring instrument MG and supplied to the computer R. It is thereby of no significance whether the formation of the samples from the possibly analog signal is implemented in the measuring instrument MG or in the computer R. Both versions are provided for the method. For example, the measuring instrument MG can be an electrocardiograph (ECG), an electroencephalograph (EEG) or a device that works according to the method presented in document [5]. The classification result, which is determined by the computer R in the above-described way, is further-processed in a means for further-processing WV [and] presented, for example, to a user. For example, the means WV can be a printer, a picture screen or a loudspeaker via which an acoustic or visual signal is forwarded to a user.

Although the present invention has been described with reference to specific embodiments, those of skill in the art will recognize that changes may be made thereto without departing from the spirit and scope of the invention as set forth in the hereafter appended claims.

The following publications were cited in the framework of this document:

[1] P. Grassberger and 1. Procaccia, Estimation of the Kolmogorov entropy from a chaotic signal, Physical Review A, Vol. 28, No. 4, pp. 2591 through 2593, October 1983.

[2] A. R. Osborne and A. Provenzale, Finite Correlation Dimension for Stochastic Systems with Power-Law Spectra, Physica D 35, Elsevier Science Publishers, ISBN 0167-2789, Amsterdam, pp. 357 through 381, 1989.

[3] A. Provenzale et al., Convergence of the $K_2$ Entropy for Random Noises with Power Law Spectra, Physica D 47, Elsevier Science Publishers, ISBN 0167-2789, Amsterdam, pp. 361 through 372, Amsterdam, 1991.

[4] G. Morfill, Komplexitätsanalyse in der Kardiologie, Physikalische Blätter, Vol. 50, No. 2, pp.156 through 160, 1994.

[5] LICOX, GMS, Gesellschaft für Medizinische SondenTechnik mbH, Advanced Tissue Monitoring.

What is claimed is:

1. A method for the classification of a time series, comprising the steps of:

generating a signal representing a dynamic process;

sampling, using a sampler, the generated signal, producing a prescribable plurality of samples;

determining, using a computer, values $c_t^{n,\tau,p,\tilde{N},\epsilon}$ of a generalized correlation integral for at least a part of the samples;

determining the value $c_t^{n,\tau,p,\tilde{N},\epsilon}$ of the generalized correlation integral upon employment of preceding samples and future samples;

determining a functions family of an entropy function $h(p, \epsilon)$ from the values $c_t^{n,\tau,p,\tilde{N},\epsilon}$ of the generalized correlation integral, wherein the preceding samples and the future samples are respectively past and future samples in time with reference to the sample for which the value $c_t^{n,\tau,p,\tilde{N},\epsilon}$ of the generalized correlation integral is respectively determined;

employing a plurality (p) of the steps to the future considered sample as family parameter of the functions family of the entropy function $h(p,\epsilon)$;

employing a partition interval quantity ($\epsilon$) of a data space in which the samples can be located as a running variable of the functions family of the entropy function $h(p,\epsilon)$; and classifying the time series on the basis of the curve of the functions family of the entropy function h(p,ε).

2. A method as claimed in claim 1, wherein the value $c_t^{n,\tau,p,\hat{N},\epsilon}$ of the generalized correlation integral is respectively derived from a medium plurality of samples that are located in an environment of predetermined size around the sample for which the value $c_t^{n,\tau,p,\hat{N},\epsilon}$ of the generalized correlation integral is respectively determined.

3. A method as claimed in claim 2, wherein the size of the environment is dependent on the partition interval quantity (ε).

4. A method as claimed in claim 1, wherein the respective value $c_t^{n,\tau,p,\hat{N},\epsilon}$ of the generalized correlation integral is formed according to one of the following rules:

$$c_t^{n,\tau,p,\hat{N},\varepsilon} = \frac{1}{\hat{N}} \sum_{\hat{i}=1}^{\hat{N}} \Theta\left(\frac{\varepsilon}{f} - \left\|\underline{x}_t^{n,\tau,p} - \underline{x}_{\hat{i}}^{n,\tau,p}\right\|\right), \quad (1)$$

with $$\underline{x}_t^{n,\tau,p} = (x_t, x_{t+\tau}, \cdots, x_{t+(n-1)\tau}, x_{t+(n-1+p)\tau}),$$

with $$\Theta(z) = \begin{cases} 0: & z \leq 0 \\ 1: & z > 0 \end{cases}, \text{ whereby}$$

$x_t$ references the sample $x_t$ of the time series at the time t,

τ references the time interval that respectively lies between two samples $x_t$, $x_{t+1}$, $x_{t+\tau}$ references a sample of the time series at a time t+τ, n references a plurality of preceding samples taken into consideration, p references the plurality of steps (time intervals) to the future sample taken into consideration, $\underline{x}_t^{n,\tau,p}$ references the sample vector, f references an arbitrary number, $\hat{t}$ references a running index with which all sample vectors $\underline{x}_t^{n,\tau,p}$ that are taken into consideration in the respectively employed, generalized correlation integral at the times $\hat{t}$, $\hat{N}$ references a plurality of sample vectors $\underline{x}_t^{n,\tau,p}$ that are taken into consideration in the respectively employed, generalized correlation integral, ε references the partition interval quantity of a data space in which the samples can be located, Θ(z) references a heavy side function, $$c_t^{n,\tau,p,\hat{N},\varepsilon} = \frac{1}{\hat{N}} \sum_{\hat{i}=1}^{\hat{N}} \Theta\left(\frac{\varepsilon}{f} - \left|\underline{x}_t^{n,\tau,p} - \underline{x}_{\hat{i}}^{n,\tau,p}\right|^m\right), \quad (2)$$

wherein m references an arbitrary number.

5. A method as claimed in claim 1, wherein the functions family of the entropy function h(p, ε) is formed according to the following rule:

$$h(p,\varepsilon) = \frac{1}{\tau}\lim_{n\to\infty}\lim_{\hat{N}\to\infty}\frac{1}{\hat{N}}\sum_{\hat{t}=1}^{\hat{N}}\log\frac{c_t^{n,\tau,p,\hat{N},\varepsilon}}{c_t^{n-1,\tau,l,\hat{N},\varepsilon}}. \quad (3)$$

6. A method as claimed in claim 1, wherein, in the classification, the time series is classified into one of a first time series type and a second time series type.

7. A method as claimed in claim 1, wherein the first time series type describes a time series in which a stochastic structure exists between the samples of the time series, and the second time series type describes a time series in which no stochastic structure exists between the samples of the time series.

8. A method as claimed in claim 1, wherein the partition interval quantity (ε) with logarithmized scale is employed as a running variable of the functions family.

9. A method as claimed in claim 8, wherein the classification of the time series occurs according to at least one of the following criteria with respect to the curve of the functions family of the entropy function h(p, ε):

when the curve is characterized by a substantially horizontal family of straight lines, then the time series is classified into a first time series type;

when the curve is characterized by a functions family that, for smaller partition interval quantities (ε), exhibits a substantially horizontal family of straight lines and, with increasing partition interval quantities (ε), exhibits a family of straight lines with positive slope after kink partition interval quantities (ε'), then the time series is classified into a second time series type;

when the curve for all future samples (p) is essentially characterized by a straight line with positive slope, then the time series is classified into a third time series type;

when the curve is essentially characterized by a family of straight lines with shifted straight lines with positive slope lying substantially parallel to one another, then the time series is classified into a fourth time series type.

10. A method as claimed in claim 1, wherein the step of generating the signal comprises the step of producing a measured electrocardiogram signal (ECG) which is used as the signal.

11. A method as claimed in claim 1, wherein the step of generating the signal comprises them step of producing a measured electroencephalogram signal (EEG) which is used as the signal.

12. A method as claimed in claim 1, wherein the step of generating the signal comprises the steps of:

producing a voltage curve representing a brain pressure; and producing a measured signal from the voltage curve which is used as the signal.

13. A method as claimed in claim 1, wherein the step of generating the signal comprises the step of producing a measured signal proportional to rate curves of a financial market which is used as the signal.

* * * * *